(12) United States Patent
Miller et al.

(10) Patent No.: US 7,472,171 B2
(45) Date of Patent: Dec. 30, 2008

(54) METHOD AND SYSTEM FOR DETERMINING RECEIPT OF A DELAYED COOKIE IN A CLIENT-SERVER ARCHITECTURE

(75) Inventors: Lawrence Miller, New York, NY (US); William Deans, Allentown, PA (US); Mike Moore, New York, NY (US)

(73) Assignee: JPMorgan Chase Bank, National Association, New York, NY (US)

( * ) Notice: Subject to any disclaimer, the term of this patent is extended or adjusted under 35 U.S.C. 154(b) by 905 days.

(21) Appl. No.: 10/064,221

(22) Filed: Jun. 21, 2002

(65) Prior Publication Data

US 2003/0236862 A1    Dec. 25, 2003

(51) Int. Cl.
*G06F 15/16* (2006.01)
*G06F 15/173* (2006.01)

(52) U.S. Cl. ...................... 709/219; 709/225
(58) Field of Classification Search ............... None
See application file for complete search history.

(56) References Cited

U.S. PATENT DOCUMENTS

| | | | |
|---|---|---|---|
| 3,896,266 A | 7/1975 | Waterbury | |
| 3,938,091 A | 2/1976 | Atalla et al. | |
| 4,321,672 A | 3/1982 | Braun et al. | |
| 4,567,359 A | 1/1986 | Lockwood | |
| 4,633,397 A | 12/1986 | Macco | |
| 4,695,880 A | 9/1987 | Johnson et al. | |
| 4,696,491 A | 9/1987 | Stenger | |
| 4,713,761 A | 12/1987 | Sharpe et al. | |
| 4,725,719 A | 2/1988 | Oncken et al. | |
| 4,745,468 A | 5/1988 | Von Kohorn | |
| 4,799,156 A | 1/1989 | Shavit | |
| 4,801,787 A | 1/1989 | Suzuki | |
| 4,823,264 A | 4/1989 | Deming | |
| 4,882,675 A | 11/1989 | Nichtberger et al. | |
| 4,926,255 A | 5/1990 | Von Kohorn | |
| 4,941,090 A | 7/1990 | McCarthy | |
| 4,964,043 A | 10/1990 | Galvin | |
| 4,992,940 A | 2/1991 | Dworkin | |

(Continued)

FOREIGN PATENT DOCUMENTS

DE     197 31 293     1/1999

(Continued)

OTHER PUBLICATIONS

Nelte, Michael and Elton Saul. Cookies: Weaving the Web into a State. Crossroads, vol. 7, issue 1. Fall 2000. ACM Press. 6 pages.*

(Continued)

*Primary Examiner*—Patrice Winder
*Assistant Examiner*—Jeffrey R Swearingen
(74) *Attorney, Agent, or Firm*—Hunton & Williams, LLP (57) ABSTRACT

In a client-server architecture, a semi-persistent connection between the client and the server allows delayed or asynchronous transmission of a cookie or token. Delayed or asynchronous transmission of the cookie allows initial web page generation and display while awaiting a slow cookie, such as a cryptographically generated cookie that might be used for single-session sign-on. A technique for determining whether the client has received the cookie is also provided.

4 Claims, 3 Drawing Sheets

U.S. PATENT DOCUMENTS

| | | |
|---|---|---|
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,220,501 A | 6/1993 | Lawlor |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,317,683 A | 5/1994 | Hager et al. |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Chang |
| 5,479,530 A | 12/1995 | Nair et al. |
| 5,485,370 A | 1/1996 | Moss et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davis et al. |
| 5,546,452 A | 8/1996 | Andrews |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,197 A | 12/1996 | Chen |
| 5,590,199 A | 12/1996 | Krajewski et al. |
| 5,592,378 A | 1/1997 | Cameron |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Green et al. |
| 5,603,025 A | 2/1997 | Tabb |
| 5,604,490 A | 2/1997 | Blakley et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,653,914 A | 8/1997 | Holmes et al. |
| 5,657,383 A | 8/1997 | Gerber |
| 5,659,165 A | 8/1997 | Jennings |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Pinard et al. |
| 5,761,647 A | 6/1998 | Boushy |
| 5,761,661 A | 6/1998 | Coussens |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schneier et al. |
| 5,774,122 A | 6/1998 | Kojima |
| 5,774,670 A * | 6/1998 | Montulli ..................... 709/227 |
| 5,778,178 A | 7/1998 | Arunachalam |
| 5,784,562 A | 7/1998 | Diener |
| 5,787,403 A | 7/1998 | Randle |
| 5,787,404 A | 7/1998 | Fernandez-Holman |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid et al. |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,460 A | 11/1998 | Bednar |
| 5,832,476 A | 11/1998 | Tada |
| 5,835,087 A | 11/1998 | Herz |
| 5,835,580 A | 11/1998 | Fraser |
| 5,835,603 A | 11/1998 | Coutts |
| 5,838,906 A | 11/1998 | Doyle |

| | | | | | | |
|---|---|---|---|---|---|---|
| 5,842,178 A | 11/1998 | Giovannoli | | 5,963,953 A | 10/1999 | Cram et al. |
| 5,842,211 A | 11/1998 | Horadan | | 5,966,695 A | 10/1999 | Melchione et al. |
| 5,844,553 A | 12/1998 | Hao | | 5,966,699 A | 10/1999 | Zandi |
| 5,845,259 A | 12/1998 | West et al. | | 5,967,896 A | 10/1999 | Jorasch et al. |
| 5,845,260 A | 12/1998 | Nakano et al. | | 5,969,318 A | 10/1999 | Mackenthun |
| 5,847,709 A | 12/1998 | Card | | 5,970,143 A | 10/1999 | Schneier et al. |
| 5,848,143 A | 12/1998 | Andrews | | 5,970,470 A | 10/1999 | Walker et al. |
| 5,848,400 A | 12/1998 | Chang | | 5,970,478 A | 10/1999 | Walker et al. |
| 5,848,427 A | 12/1998 | Hyodo | | 5,970,482 A | 10/1999 | Pham |
| 5,852,812 A | 12/1998 | Reeder | | 5,970,483 A | 10/1999 | Evans |
| 5,857,079 A | 1/1999 | Claus et al. | | 5,978,467 A | 11/1999 | Walker et al. |
| 5,862,223 A | 1/1999 | Walker | | 5,983,196 A | 11/1999 | Wendkos |
| 5,864,830 A | 1/1999 | Armetta et al. | | 5,987,434 A | 11/1999 | Libman |
| RE36,116 E | 2/1999 | McCarthy | | 5,987,498 A | 11/1999 | Athing et al. |
| 5,870,718 A | 2/1999 | Spector | | 5,991,736 A | 11/1999 | Ferguson et al. |
| 5,870,724 A | 2/1999 | Lawlor | | 5,991,738 A | 11/1999 | Ogram |
| 5,870,725 A | 2/1999 | Belinger et al. | | 5,991,748 A | 11/1999 | Taskett |
| 5,871,398 A | 2/1999 | Schneier et al. | | 5,991,751 A | 11/1999 | Rivette et al. |
| 5,873,072 A | 2/1999 | Kight | | 5,991,780 A | 11/1999 | Rivette |
| 5,873,096 A | 2/1999 | Lim | | 5,991,878 A * | 11/1999 | McDonough et al. .......... 707/9 |
| 5,875,296 A * | 2/1999 | Shi et al. ........................ 726/5 | | 5,995,948 A | 11/1999 | Whitford |
| 5,880,769 A | 3/1999 | Nemirofsky | | 5,995,976 A | 11/1999 | Walker et al. |
| 5,883,810 A | 3/1999 | Franklin et al. | | 5,999,596 A | 12/1999 | Walker et al. |
| 5,884,032 A | 3/1999 | Bateman | | 5,999,907 A | 12/1999 | Donner |
| 5,884,270 A | 3/1999 | Walker et al. | | 6,000,033 A | 12/1999 | Kelly et al. |
| 5,884,272 A | 3/1999 | Walker et al. | | 6,001,016 A | 12/1999 | Walker et al. |
| 5,884,274 A | 3/1999 | Walker et al. | | 6,003,762 A | 12/1999 | Hayashida |
| 5,884,288 A | 3/1999 | Chang | | 6,005,939 A | 12/1999 | Fortenberry et al. |
| 5,889,863 A | 3/1999 | Weber | | 6,006,205 A | 12/1999 | Loeb et al. |
| 5,892,900 A | 4/1999 | Ginter et al. | | 6,006,249 A | 12/1999 | Leong |
| 5,898,780 A | 4/1999 | Liu et al. | | 6,009,415 A | 12/1999 | Shurling et al. |
| 5,899,982 A | 5/1999 | Randle | | 6,009,442 A | 12/1999 | Chen et al. |
| 5,903,881 A | 5/1999 | Schrader | | 6,010,404 A | 1/2000 | Walker et al. |
| 5,909,486 A | 6/1999 | Walker et al. | | 6,012,088 A | 1/2000 | Li et al. |
| 5,910,988 A | 6/1999 | Ballard | | 6,012,983 A | 1/2000 | Walker et al. |
| 5,913,202 A | 6/1999 | Motoyama | | 6,014,439 A | 1/2000 | Walker et al. |
| 5,914,472 A | 6/1999 | Foladare et al. | | 6,014,635 A | 1/2000 | Harris et al. |
| 5,915,244 A | 6/1999 | Jack et al. | | 6,014,636 A | 1/2000 | Reeder |
| 5,918,214 A | 6/1999 | Perkowski | | 6,014,638 A | 1/2000 | Burge et al. |
| 5,918,217 A | 6/1999 | Maggioncalda | | 6,014,641 A | 1/2000 | Loeb et al. |
| 5,918,239 A | 6/1999 | Allen et al. | | 6,014,645 A | 1/2000 | Cunningham |
| 5,920,847 A | 7/1999 | Kolling et al. | | 6,016,810 A | 1/2000 | Ravenscroft |
| 5,921,864 A | 7/1999 | Walker et al. | | 6,018,714 A | 1/2000 | Risen, Jr. |
| 5,923,763 A | 7/1999 | Walker et al. | | 6,018,718 A | 1/2000 | Walker et al. |
| 5,926,796 A | 7/1999 | Walker et al. | | 6,024,640 A | 2/2000 | Walker et al. |
| 5,926,812 A | 7/1999 | Hilsenrath | | 6,026,398 A | 2/2000 | Brown et al. |
| 5,930,764 A | 7/1999 | Melchione | | 6,026,429 A | 2/2000 | Jones et al. |
| 5,933,816 A | 8/1999 | Zeanah et al. | | 6,029,141 A * | 2/2000 | Bezos et al. .................. 705/27 |
| 5,933,817 A | 8/1999 | Hucal | | 6,032,134 A | 2/2000 | Weissman |
| 5,933,823 A | 8/1999 | Cullen | | 6,032,147 A | 2/2000 | Williams et al. |
| 5,933,827 A | 8/1999 | Cole et al. | | 6,038,547 A | 3/2000 | Casto |
| 5,940,812 A | 8/1999 | Tengel et al. | | 6,038,552 A | 3/2000 | Fleischl et al. |
| 5,943,656 A | 8/1999 | Crooks | | 6,042,006 A | 3/2000 | Van Tilburg et al. |
| 5,944,824 A | 8/1999 | He | | 6,044,362 A | 3/2000 | Neely |
| 5,945,653 A | 8/1999 | Walker et al. | | 6,045,039 A | 4/2000 | Stinson et al. |
| 5,946,388 A | 8/1999 | Walker et al. | | 6,049,778 A | 4/2000 | Walker et al. |
| 5,947,747 A | 9/1999 | Walker et al. | | 6,049,782 A | 4/2000 | Gottesman et al. |
| 5,949,044 A | 9/1999 | Walker et al. | | 6,049,835 A | 4/2000 | Gagnon |
| 5,949,875 A | 9/1999 | Walker et al. | | 6,055,573 A * | 4/2000 | Gardenswartz et al. ..... 709/224 |
| 5,950,173 A | 9/1999 | Perkowski | | 6,055,637 A | 4/2000 | Hudson et al. |
| 5,950,174 A | 9/1999 | Brendzel | | 6,061,665 A | 5/2000 | Bahreman |
| 5,950,206 A | 9/1999 | Krause | | 6,064,987 A | 5/2000 | Walker et al. |
| 5,952,639 A | 9/1999 | Ohki | | 6,065,120 A | 5/2000 | Laursen et al. |
| 5,952,641 A | 9/1999 | Korshun | | 6,065,675 A | 5/2000 | Teicher |
| 5,953,710 A | 9/1999 | Fleming | | 6,070,147 A | 5/2000 | Harms et al. |
| 5,956,695 A | 9/1999 | Carrithers et al. | | 6,070,153 A | 5/2000 | Simpson |
| 5,958,007 A | 9/1999 | Lee et al. | | 6,070,244 A | 5/2000 | Orchier et al. |
| 5,960,411 A | 9/1999 | Hartman et al. | | 6,073,105 A | 6/2000 | Sutcliffe et al. |
| 5,961,593 A | 10/1999 | Gabber et al. | | 6,073,113 A | 6/2000 | Guinan |
| 5,963,635 A | 10/1999 | Szlam et al. | | 6,073,241 A * | 6/2000 | Rosenberg et al. ............. 726/3 |
| 5,963,915 A * | 10/1999 | Kirsch ........................ 705/26 | | 6,075,519 A | 6/2000 | Okatani et al. |
| 5,963,925 A | 10/1999 | Kolling et al. | | 6,076,072 A | 6/2000 | Libman |
| 5,963,952 A | 10/1999 | Smith | | 6,078,956 A * | 6/2000 | Bryant et al. ................ 709/224 |

| Patent No. | Date | Inventor(s) |
|---|---|---|
| 6,081,790 A | 6/2000 | Rosen |
| 6,081,810 A | 6/2000 | Rosenzweig et al. |
| 6,085,168 A | 7/2000 | Mori et al. |
| 6,088,444 A | 7/2000 | Walker et al. |
| 6,088,451 A | 7/2000 | He et al. |
| 6,088,683 A | 7/2000 | Jalili |
| 6,088,686 A | 7/2000 | Walker et al. |
| 6,088,700 A | 7/2000 | Larsen et al. |
| 6,091,817 A | 7/2000 | Bertina et al. |
| 6,092,196 A | 7/2000 | Reiche |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,105,012 A | 8/2000 | Chang et al. |
| 6,105,865 A | 8/2000 | Hardesty |
| 6,111,858 A | 8/2000 | Greaves et al. |
| 6,112,181 A | 8/2000 | Shear et al. |
| 6,115,690 A | 9/2000 | Wong |
| 6,119,093 A | 9/2000 | Walker et al. |
| 6,119,099 A | 9/2000 | Walker et al. |
| 6,128,599 A | 10/2000 | Walker et al. |
| 6,128,602 A | 10/2000 | Northington et al. |
| 6,131,810 A | 10/2000 | Weiss et al. |
| 6,134,549 A | 10/2000 | Regnier et al. |
| 6,134,592 A | 10/2000 | Montulli |
| 6,135,349 A | 10/2000 | Zirkel |
| 6,138,106 A | 10/2000 | Walker et al. |
| 6,138,118 A | 10/2000 | Koppstein et al. |
| 6,141,651 A | 10/2000 | Riley et al. |
| 6,141,666 A | 10/2000 | Tobin |
| 6,144,946 A | 11/2000 | Iwamura |
| 6,144,948 A | 11/2000 | Walker et al. |
| 6,145,086 A | 11/2000 | Bellemore et al. |
| 6,148,293 A | 11/2000 | King |
| 6,151,584 A | 11/2000 | Papierniak et al. |
| 6,154,750 A | 11/2000 | Roberge et al. |
| 6,154,879 A | 11/2000 | Roberge et al. |
| 6,161,182 A | 12/2000 | Nadooshan |
| 6,164,533 A | 12/2000 | Barton |
| 6,170,011 B1 | 1/2001 | Macleod Beck et al. |
| 6,178,511 B1 | 1/2001 | Cohen et al. |
| 6,182,052 B1 | 1/2001 | Fulton et al. |
| 6,182,142 B1 | 1/2001 | Win et al. |
| 6,182,225 B1 | 1/2001 | Hagiuda et al. |
| 6,185,242 B1 | 2/2001 | Arthur et al. |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,151 B1 | 3/2001 | Musgrave et al. |
| 6,208,978 B1 | 3/2001 | Walker et al. |
| 6,208,984 B1 | 3/2001 | Rosenthal |
| 6,216,115 B1 | 4/2001 | Barrameda et al. |
| 6,219,706 B1 | 4/2001 | Fan |
| 6,222,914 B1 | 4/2001 | McMullin |
| 6,226,623 B1 | 5/2001 | Schein et al. |
| 6,226,679 B1 | 5/2001 | Gupta |
| 6,227,447 B1 | 5/2001 | Campisano |
| 6,230,148 B1 | 5/2001 | Pare et al. |
| 6,243,688 B1 | 6/2001 | Kalina |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,275,944 B1 | 8/2001 | Kao et al. |
| 6,289,322 B1 | 9/2001 | Kitchen et al. |
| 6,298,330 B1 | 10/2001 | Gardenswartz et al. |
| 6,298,356 B1 | 10/2001 | Jawahar et al. |
| 6,301,567 B1 | 10/2001 | Leong et al. |
| 6,308,273 B1 | 10/2001 | Goertzel et al. |
| 6,308,274 B1 | 10/2001 | Swift |
| 6,311,275 B1 | 10/2001 | Jin et al. |
| 6,317,838 B1 | 11/2001 | Baize |
| 6,324,524 B1 | 11/2001 | Lent et al. |
| 6,327,573 B1 | 12/2001 | Walker et al. |
| 6,327,578 B1 | 12/2001 | Linehan |
| 6,332,192 B1 | 12/2001 | Boroditsky et al. |
| 6,336,104 B1 | 1/2002 | Walker et al. |
| 6,343,279 B1 | 1/2002 | Bissonette et al. |
| 6,345,261 B1 | 2/2002 | Feidelson |
| 6,349,242 B2 | 2/2002 | Mahaffey |
| 6,349,336 B1 | 2/2002 | Sit et al. |
| 6,385,591 B1 | 5/2002 | Mankoff |
| 6,385,652 B1 | 5/2002 | Brown et al. |
| 6,401,125 B1 | 6/2002 | Makarios et al. |
| 6,401,211 B1 | 6/2002 | Brezak, Jr. et al. |
| 6,408,389 B2 | 6/2002 | Grawrock et al. |
| 6,418,457 B1 | 7/2002 | Schmidt et al. |
| 6,438,594 B1 | 8/2002 | Bowman-Amuah |
| 6,438,666 B2 | 8/2002 | Cassagnol et al. |
| 6,449,765 B1 * | 9/2002 | Ballard ..................... 717/174 |
| 6,453,353 B1 | 9/2002 | Win et al. |
| 6,460,141 B1 | 10/2002 | Olden |
| 6,493,677 B1 | 12/2002 | von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,510,523 B1 | 1/2003 | Perlman et al. |
| 6,526,404 B1 | 2/2003 | Slater et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,539,424 B1 | 3/2003 | Dutta |
| 6,557,039 B1 | 4/2003 | Leong et al. |
| 6,574,348 B1 | 6/2003 | Venkatesan et al. |
| 6,581,040 B1 | 6/2003 | Wright et al. |
| 6,584,505 B1 | 6/2003 | Howard et al. |
| 6,584,508 B1 | 6/2003 | Epstein et al. |
| 6,592,044 B1 | 7/2003 | Wong et al. |
| 6,609,113 B1 | 8/2003 | O'Leary et al. |
| 6,609,125 B1 | 8/2003 | Layne et al. |
| 6,609,198 B1 | 8/2003 | Wood et al. |
| 6,609,654 B1 | 8/2003 | Anderson et al. |
| 6,618,579 B1 | 9/2003 | Smith et al. |
| 6,618,806 B1 | 9/2003 | Brown et al. |
| 6,623,415 B2 | 9/2003 | Gates et al. |
| 6,668,322 B1 | 12/2003 | Wood et al. |
| 6,687,222 B1 | 2/2004 | Albert et al. |
| 6,718,482 B2 | 4/2004 | Sato et al. |
| 6,718,535 B1 | 4/2004 | Underwood |
| 6,725,269 B1 | 4/2004 | Megiddo |
| 6,738,779 B1 | 5/2004 | Shapira |
| 6,751,654 B2 * | 6/2004 | Massarani et al. ........... 709/219 |
| 6,754,833 B1 | 6/2004 | Black et al. |
| 6,755,341 B1 | 6/2004 | Wong et al. |
| 6,766,370 B2 | 7/2004 | Glommen et al. |
| 6,772,146 B2 | 8/2004 | Khemlani et al. |
| 6,785,810 B1 | 8/2004 | Lirov et al. |
| 6,789,115 B1 | 9/2004 | Singer et al. |
| 6,805,288 B1 | 10/2004 | Routhenstein et al. |
| 6,810,395 B1 | 10/2004 | Bharat |
| 6,820,202 B1 | 11/2004 | Wheeler et al. |
| 6,832,202 B1 | 12/2004 | Schuyler et al. |
| 6,856,970 B1 | 2/2005 | Campbell et al. |
| 6,892,231 B2 | 5/2005 | Jager |
| 6,907,566 B1 * | 6/2005 | McElfresh et al. .......... 715/517 |
| 6,925,481 B2 | 8/2005 | Singhal et al. |
| 6,983,421 B1 | 1/2006 | Lahti et al. |

| | | | |
|---|---|---|---|
| 7,003,565 B2 * | 2/2006 | Hind et al. ............... 709/224 | |
| 7,020,696 B1 | 3/2006 | Perry et al. | |
| 7,092,992 B1 * | 8/2006 | Yu ............................. 709/206 | |
| 2001/0012974 A1 | 8/2001 | Mahaffey | |
| 2001/0027474 A1 | 10/2001 | Nachman et al. | |
| 2001/0032184 A1 | 10/2001 | Tenembaum | |
| 2001/0047295 A1 | 11/2001 | Tenembaum | |
| 2001/0051917 A1 | 12/2001 | Bissonette et al. | |
| 2001/0054003 A1 | 12/2001 | Chien et al. | |
| 2002/0007313 A1 | 1/2002 | Mai et al. | |
| 2002/0007460 A1 | 1/2002 | Azuma | |
| 2002/0010599 A1 | 1/2002 | Levison | |
| 2002/0010668 A1 | 1/2002 | Travis et al. | |
| 2002/0018585 A1 | 2/2002 | Kim | |
| 2002/0019938 A1 | 2/2002 | Aarons | |
| 2002/0023108 A1 | 2/2002 | Daswani et al. | |
| 2002/0032613 A1 | 3/2002 | Buettgenbach et al. | |
| 2002/0032650 A1 | 3/2002 | Hauser et al. | |
| 2002/0059141 A1 | 5/2002 | Davies et al. | |
| 2002/0077978 A1 | 6/2002 | O'Leary et al. | |
| 2002/0099826 A1 | 7/2002 | Summers et al. | |
| 2002/0104006 A1 | 8/2002 | Boate et al. | |
| 2002/0104017 A1 | 8/2002 | Stefan | |
| 2002/0107788 A1 | 8/2002 | Cunningham | |
| 2002/0152163 A1 | 10/2002 | Bezos et al. | |
| 2002/0165949 A1 | 11/2002 | Na | |
| 2002/0174010 A1 | 11/2002 | Rice, III | |
| 2002/0184507 A1 | 12/2002 | Makower et al. | |
| 2002/0188869 A1 | 12/2002 | Patrick | |
| 2002/0191548 A1 | 12/2002 | Ylonen et al. | |
| 2003/0018915 A1 | 1/2003 | Stoll | |
| 2003/0023880 A1 | 1/2003 | Edward et al. | |
| 2003/0034388 A1 | 2/2003 | Routhenstein et al. | |
| 2003/0037142 A1 | 2/2003 | Munger et al. | |
| 2003/0046587 A1 | 3/2003 | Bheemarasetti et al. | |
| 2003/0046589 A1 | 3/2003 | Gregg | |
| 2003/0051026 A1 | 3/2003 | Carter et al. | |
| 2003/0070069 A1 | 4/2003 | Belapurkar et al. | |
| 2003/0070084 A1 | 4/2003 | Satomaa et al. | |
| 2003/0074580 A1 | 4/2003 | Knouse et al. | |
| 2003/0079147 A1 | 4/2003 | Hsieh et al. | |
| 2003/0084345 A1 | 5/2003 | Bjornestad et al. | |
| 2003/0084647 A1 | 5/2003 | Smith et al. | |
| 2003/0088552 A1 | 5/2003 | Bennett et al. | |
| 2003/0105981 A1 | 6/2003 | Miller et al. | |
| 2003/0110399 A1 | 6/2003 | Rail | |
| 2003/0115160 A1 | 6/2003 | Nowlin et al. | |
| 2003/0119642 A1 | 6/2003 | Gates et al. | |
| 2003/0154403 A1 | 8/2003 | Keinsley et al. | |
| 2003/0159072 A1 | 8/2003 | Bellinger et al. | |
| 2003/0163733 A1 | 8/2003 | Barriga-Caceres et al. | |
| 2003/0177067 A1 | 9/2003 | Cowell et al. | |
| 2003/0191549 A1 | 10/2003 | Otsuka et al. | |
| 2004/0031856 A1 | 2/2004 | Atsmon et al. | |
| 2004/0117409 A1 | 6/2004 | Scahill et al. | |
| 2005/0080747 A1 | 4/2005 | Anderson et al. | |
| 2005/0082362 A1 | 4/2005 | Anderson et al. | |
| 2005/0086160 A1 | 4/2005 | Wong et al. | |
| 2005/0086177 A1 | 4/2005 | Anderson et al. | |
| 2005/0278641 A1 | 12/2005 | Mansour et al. | |

FOREIGN PATENT DOCUMENTS

| | | |
|---|---|---|
| EP | 0 884 877 | 12/1998 |
| EP | 0 917 119 | 5/1999 |
| EP | 1 022 664 | 7/2000 |
| JP | H10-187467 | 7/1998 |
| JP | 2005-242976 | 9/2005 |
| WO | WO 97/43736 | 11/1997 |
| WO | WO 99/40507 A1 | 8/1999 |
| WO | WO 99/52051 | 10/1999 |
| WO | WO 00/68858 | 11/2000 |
| WO | WO 01/18656 A1 | 3/2001 |
| WO | WO 01/35355 | 5/2001 |
| WO | WO 01/43084 | 6/2001 |
| WO | WO 01/88659 | 11/2001 |
| WO | WO 02/17082 A1 | 2/2002 |
| WO | WO 2004/079603 | 9/2004 |

OTHER PUBLICATIONS

Kriston, David M. HTTP Cookies: Standards, privacy, and politics. ACM Transactions on Internet Technology. vol. 1, issue 2. Nov. 2001. ACM Press. 48 pages.*
Kutler, A Different Drummer on the Data Highway, American Banker, Section: No. 91, vol. 160, May. 12, 1995, p. 14.
Epper, A Player Goes After Big Bucks in Cyberspace, American Banker, vol. 160, No. 86, ISSN: 0002-7561, May 5, 1995, p. 17.
Berry et al., A potent new tool for selling databse, Business Week, Cover Story, Sep. 5, 1994, pp. 56-62.
Applets, java.sun.com, May 21, 1999.
Associates National Bank (DE) Credit Card, The Associates, www.theassociates.com/consumer/credit_cards/main.html, Apr. 6, 1999, 6 pages.
At Your Request, www.wingspanbank.com, Sep. 28, 1999.
Anonymous, Aversion Therapy: Banks Overcoming Fear of the Net to Develop Safe Internet-based Payment System w/ Netscape Communicator, Network World, ISSN: 0887-7661, Dec. 12, 1994.
Java, Banking on Java(TM) Technology, java.sun.com, May 21, 1999.
Bechtel Construction Operations Incorporated Standardizes on Primavera's Expedition Contract Management Software, Business Wire, Jul. 27, 1999.
Anonymous, Cobra Overview, arch2.htm at pent21.infosys.tuwien.ac.at, May 25, 1999.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge—What's Next?, Seattle Times, Mar. 6, 1995.
Marlin, Chasing Document Management, Inform, vol. 13, No. 4, Apr. 199, pp. 76-82.
Consortium Created to Manage Common Electronic Purse Specifications, http://www.visa.com/av/news/PRmisc05119.vhtml, printed Feb. 23, 2001.
Construction Financing to Build Your Own Home, ISBN: 0962864307, Jul. 1990.
Civitello Jr., Construction Operations Manual of Policies and Procedures, Third Edition, 2000.
Marchman, Construction Scheduling with Primavera Project Planner, May 25, 1999.
Chester, Cross-platform integration with XML and Soap, IT PTO Sep.-Oct. 2001.
Mitchell, Cyberspace: Crafting Sofware . . . , Business Week, Feb. 27, 1999, pp. 78-86.
Friedman, Dictionary of Business Terms, Barron's Third Edition, Copyright 2000.
Strassel, Dutch Software Concern Experiments with Electronic 'Cash' in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise Javabeans(TM) Technology: Server Component Model for the Java(TM) platform, java.sun.com, May 2, 1999.
Maize, Fannie Mae on the Web, Document ID: 52079, May 8, 1995.
FreeMarkets, printed on Apr. 26, 1999.
The Gale Group, G&D America's Multi-application Smart Card Selected for Combined Payroll and 'Virtual Banking' Program in Mexico, Business Wire, Apr. 24, 1998, p. 241047.
Getting Smart with Java: Sun Micro Says American Express to Use Java for Smart Card, ABCNews.com, printed on Jun. 6, 2000.
Getting Started: Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.

Meredith, Internet bank moves closer to virtual reality, USA Today, May 5, 1995.
Radosevich, Is Work Flow Working?, CNN.com, Apr. 6, 1999 at <http://www.cnn.com/TECH/computing/9904/06/workflow/ent. idg, p. 1 of 5, retrieved from the internet on Nov. 28, 2005.
Java, Java (TM) Technology in the Real World, java.sun.com, May 21, 1999.
Java, Java(TM) Remote Method Invocation (RMI) Interface, java.sum.con, May 32, 1999.
Java, Java(TM) Servlet API, java.sun.com, May 21, 1999.
OMG, Library, www.omg.com, May 25, 1999.
Mary C. Lacity, et al., Mary C. Lacity, et al., The Information Systems Outsourcing Bandwagon, Sloan Management Review, vol. 35, No. 1, Fall 1993, pp. 73-86.
Method of Protecting Data on A Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, Nov. 9, 1994 WSJ B9.
Sirbu, et al, NetBill: An Internet Commerce System Optimized for Network Delivered Services, printed on Feb. 27, 1995.
Mitchell, Netlink Goes After An Unbanked Niche, Card Technology, ISSN: 1093-1279, Sep. 1999, p. 22.
Barnham, Network Brings Together Producers and Companies, Document ID: 17347.
Houlder, OFT Gives the Individual Top Priority: Report Calls for Deregulation of Business Lending, Document ID: 91716, Jun. 8, 1994.
Omware, Inc., Web Pages, Feb. 2000, Retrieved from http://web.archive.org/web20000226033405/www.omware.com/products.html, Retrieved from the interneet on Nov. 28, 2005.
Anonymous, Overview of Corba, May 25, 1999.
Harris, Planning Using Primavera Project Planner P3 Version 3.0, User Guide, Copyright 1999 by Eastwood Harry Pty Ltd., 1999.
Point for Windows Version 3.x Interface Marketing Guide.pdf.
Johnston, Pondering Passport: Do You Trust Microsoft With Your Data!, www.pcworld.com/resource/printable/article/0.aid,63244,00.asp, Sep. 24, 2001.
Primavera Systems, Inc.—How the World Manages Projects, Expedition Contract Control Software, www.primavera.com, Jun. 23, 2005.
Primavera and PurchasePro.com to Create E-Commerce Marketplace for Construction Industry, Primavera Ships P3, version 3.0, www.purchasepro.com/, Sep. 21, 1999, pp. 1-3.
Product Data Integration Technologies, Inc., Step Integratin Authors, printed on Apr. 26, 1999.
Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
SBA: Pro-Net, U.S. Small Business Administration Procurement Marketing and Access Network, Last Modified: Apr. 1, 1999.
Jepsen, Soap Cleans up interoperability problems on the web, IT PTO, Jan./Feb. 2001.
Safe Single-Sign-On Protocol with Minimal Password Exposure No Decryption and Technology Adaptivity, IBM Corporation, TDB 03-95, Order 95A, Mar. 1, 1995, pp. 245-248.
Sun Microsystems, Inc., Schema for Representing Corba Objects in an LDAP directory, May 21, 1999, pp. 1-9.
Jakobsson et al., Secure and lightweight advertising on the web, Computer Networks, 31 (1999) 1101-1109.
Servlet/Apple/HTML Authentication Process with Single Sign-On, IBM Corporation, IBM Order: 00A6004, Jan. 1, 2000.
Shibata, Seventh International Conference on Parallel and Distributed Systems: Workshops, IEEE Computer Society, Jul. 4-7, 2000.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
Thomas Publishing Company, SoluSource: For Engineers By Engineers, Thomas Publishing Company, Apr. 26, 1999.
Java, Staying in Touch with JNDI, java.sun.com, May 21, 1999.
Summary of The At Your Request Architecture, First USA Bank Confidential and Proprietary, Apr. 2, 1999, pp. 1-8.
Temporary Global Passwords, IBM Corporation, IBM TDB v36, n3, 03-93, Order 93A 60636, Mar. 1, 1993, pp. 451-454.
Java, The SDBC(TM) Data Access API, java.sun.com, May 21, 1999.
Carden, Philip, The New Face of Single Sign-on, Network Computing, http://www.networkcomputing.com, printed Dec. 29, 2000, 4 pages.
The check is in the email, Information Today, vol. 12, No. 3, ISSN: 8755-6286, 03/01995.
Thomas Publishing Company, ThomasNet, Apr. 26, 1999.
Ritz, Total Construction Project Management, McGraw-Hill, 1994.
Hewlett-Packard Company, Understanding Product Data Management, Hewlett-Packard Company.
Welcome to Muse, Apr. 26, 1999.
OMG, Welcome to OMG's Corba for Beginners Page!, www.omg.co, May 25, 1999.
OMG, What is Corba?, www.omg.com, May 25, 1999.
Fujimura et al., XML Voucher: Generic Voucher Language, Feb. 2003.
eCharge, eCharge Corporation, www.echarge.com, Dec. 3, 1999.

* cited by examiner

METHOD AND SYSTEM FOR DETERMINING RECEIPT OF A DELAYED COOKIE IN A CLIENT-SERVER ARCHITECTURE

BACKGROUND OF INVENTION

1. Field of the Invention

The invention pertains to the field of client-server electronic communication, and more particularly to use of a cookie or token to provide and maintain state information.

2. Description of the Related Art

The typical client-server architecture using a client browser and server generated or provided web pages is generally considered a stateless environment. To provide and maintain state information, it is known to use tokens or "cookies".

A client user logging into a site may receive many different cookies, each with its respective purpose. In some applications, the user receives a cookie that is used to select a particular webserver for load balancing, a cookie representing the user's application session, one or more cookie(s) representing the user's session used for Single Sign On with other systems, and multiple GET ACCESS cookie(s) used for Single Sign On with other GET ACCESS Systems.

The generation of some cookies, namely the GET ACCESS cookies, can take an extended period of time. In the case of the GET ACCESS cookies, the application server, on behalf of the user performs a simulated login. During the login process the application server connects to the remote system over https, screen scraps the html, logs in as the user, and retrieves the cookies from the resulting http headers. If this login fails a change password is performed on behalf of the user and the login reattempted. All of this could take quite some time degrading login performance even though the user does not need these cookies immediately upon entering the application.

What is needed is a system and method to allow a user into a site with only the cookies that are immediately necessary. Other cookies, such as the GET ACCESS cookies, are delivered asynchronously as they become available.

The preceding description is not to be construed as an admission that any of the description is prior art to the present invention.

SUMMARY OF INVENTION

In one aspect, the invention provides a method and system for sending information to a client browser comprising sending a request from a client to a server, determining whether the request includes a token, and if the token is not included in the request, determining whether the token is available to send to the client, wherein the token was created responsive to an earlier request from the client to the server.

In one aspect, the invention further comprises if the token is included in the request, making a record that the client has the token.

In one aspect, the invention further comprises if the token is available to send to the client, sending a response to the client with the token.

In one aspect, the invention further comprises if the token is not available to send to the client, sending a response to the client without the token.

In one aspect, the invention further comprises determining if a timer exceeds a predetermined value, and if the timer does not exceed the predetermined value, determining whether the token is available to send to the client, and if the timer does not exceed the predetermined value, sending a response to the client without the token.

The specific aspects and advantages of the invention described and illustrated herein are illustrative of those which can be achieved by the present invention and are not intended to be exhaustive or limiting of the possible advantages that can be realized. Thus, the aspects and advantages of this invention will be apparent from the description herein or can be learned from practicing the invention, both as embodied herein or as modified in view of any variations which may be apparent to those skilled in the art. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

In one embodiment, a request is made from the client to retrieve an http(s) page from the server (e.g. login form submitted and client expects resulting html). The server then spawns a long running process to retrieve the slow cookies and returns the fast cookies along with the html to the user immediately. The html returned from the server to the client contains a link to a clear gif retrieved over http(s). The clear gif is an image file that contains only transparent data, so appears to be "clear." The clear gif is not a file but rather the output of a program that listens for notifications that the slow cookies have been retrieved. If no such notifications arrive after some period of time (e.g., 20 seconds) the program does not return a clear gif but rather redirects the client to another URL resulting in the same program being run. This is so that the "persistent connection" between the client and the server is not recognized as such and dropped by intermediate proxies that do not allow such connections. Eventually the slow cookies will be retrieved, the clear gif program notified, and the cookies returned in the http headers of the clear gif along with the clear gif itself. After some configurable timeout the clear gif could be returned even if the slow cookies never arrive to prevent the wasting of resources.

Figure 1:
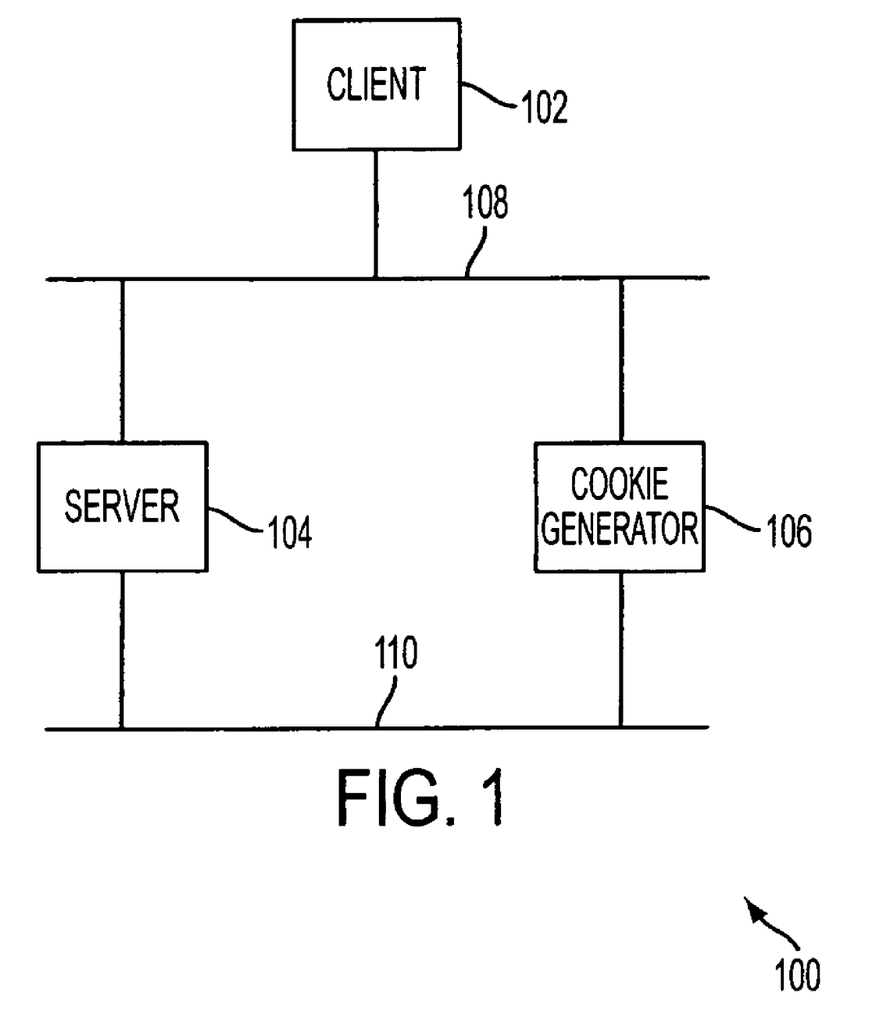
FIG. 1 illustrates a system according to one embodiment of the invention.

Referring now to FIG. 1, system 100 according to one embodiment of the invention includes a client 102, a server 104 and a cookie or token generator 106. Client 102 and server 104 are electrically connected to each other by network 108. Server 104 and cookie generator 106 are electrically connected to each other by either network 108, or by network 110. Network 108 can be any of a number of types of wired and wireless networks, such as a local area network (LAN) or wide area network (WAN). In one embodiment, network 108 is the Internet. Network 110 can also be any of a number of types of wired and wireless networks, and may also be the Internet. Depending on the needs of the system, network 108 and 110 may be parts of the same network, or they may be isolated from each other.

Although not specifically illustrated in FIG. 1, client 102, server 104 and cookie generator 106 each include removable and fixed software code storage media, a processor to run the software code, a memory, input and output devices and network interface devices, all interconnected by a system bus.

Although in FIG. 1 server 104 and cookie generator 106 are illustrated as separate entities, it is also possible that they are both elements of the same piece of hardware, but can perform different functions.

Figure 2:
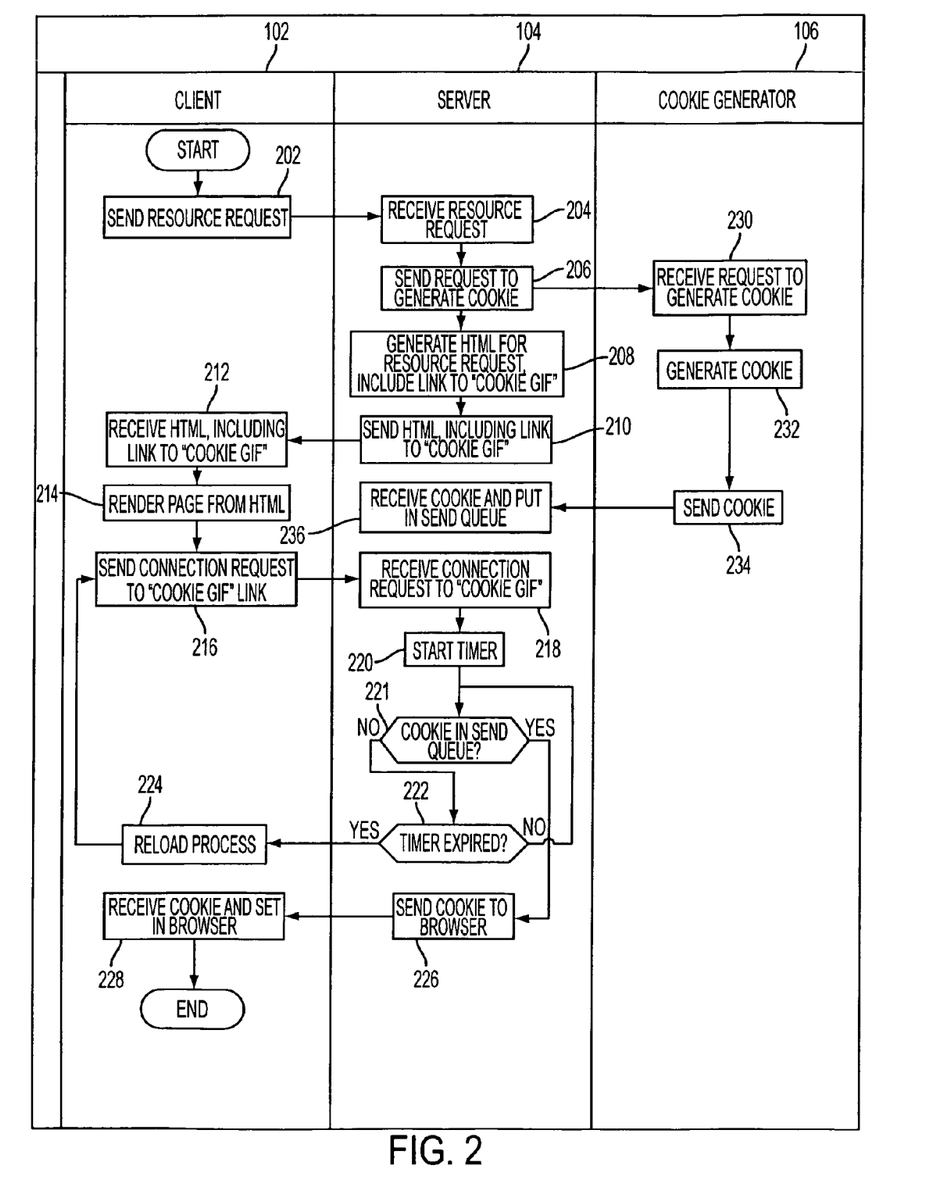
FIG. 2 illustrates steps in a method according to one embodiment of the invention.

Referring now to FIG. 2, system 100 begins at step 202 when client 102 sends a resource request to server 104. This is typically an http or https type of resource request that includes a URL corresponding to the requested resource.

At step 204, server 104 receives the resource request. Although not illustrated in FIG. 2, at step 204, server 104 also determines whether all the cookies or tokens that should be returned to client 102 exist or are immediately available. If all of the cookies or tokens exist, then the requested resource is returned to the client along with the cookies or tokens. These cookies or tokens that are immediately available are the "fast" cookies.

Assuming that there are some cookies or tokens that are not immediately available (i.e., they are "slow" cookies), then at step 206, server 104 sends a request to cookie generator 106 to generate a cookie (e.g., the "slow" cookies).

Without waiting for cookie generator 106 to generate and return the requested cookie, at step 208 server 104 begins to generate or retrieve the html for the requested resource. In addition to fast cookies, which are immediately available, the html includes a link to the clear gif, as a substitute or placeholder for the slow cookie (s).

Once server 104 has generated or retrieved the html, then at step 210, server 104 sends the html, including the link to the clear gif, to client 102.

At step 212, client 102 receives the html, including the "fast" cookies and the link to the clear gif.

At step 214, client 102 renders the html on the browser. Once step 214 is complete, the resource that was requested at step 202, including the associated "fast" cookies has been sent to client 102 from server 104 with the exception of the "slow" cookie(s).

At step 216, client 102 establishes a connection or sends a request for the clear gif that is represented by the link.

At step 218, server 104 receives the connection request for the clear gif.

At step 220, server 104 starts a timer. This timer is used to avoid time-out problems on the browser and also avoid errors from what appears to be a persistent connection between the client and the browser. In one embodiment, the timer is a count-down timer and is set to 20 seconds.

At step 221, server 104 checks to see if the cookie, requested at step 206, is present in the send queue. Therefore, it is helpful to understand the cookie generation steps that occur after step 206.

At step 230, cookie generator 106 receives the request to generate a cookie that server 104 sent at step 206.

At step 232, cookie generator 106 generates the requested cookie. As an example, this could be a GET ACCESS cookie.

At step 234, cookie generator 106 sends the requested cookie to server 104.

At step 236, server 104 receives the requested cookie and puts the cookie in a send queue.

The time required for cookie generator 106 to complete steps 230 through 234 is normally greater than the time required for server 104 to complete steps 206 through 210. For this reason, server 104 normally receives the cookie at step 236 after completing step 210. Although not illustrated, if the requested cookie is received at step 236 before server 104 completes step 210, the requested cookie can be included with the html at step 210. However, it is also possible that even though the cookie is received before server 104 completes step 210, the requested cookie is not included with the html at step 210.

After starting the timer at step 220, at step 221, server 104 determines whether the requested cookie is present in the send queue. If the cookie is present, then at step 226, server 104 sends the cookie to the client browser as part of the header in the clear gif.

At step 228, client 102 receives the clear gif, including the cookie in the header, and the browser "renders" the clear gif.

If, at step 221, server 104 determines that the requested cookie is not present in the send queue, than at step 222, server 104 determines whether the timer, started at step 220, has expired. If the timer has not expired, server 104 loops to step 221 and continues to monitor or check for the cookie in the send queue.

If at step 222, server 104 determines that the timer has expired, then at step 224, client 102 is provided instructions, such as through a redirect, to reload the process, and loops to step 216.

Figure 3:
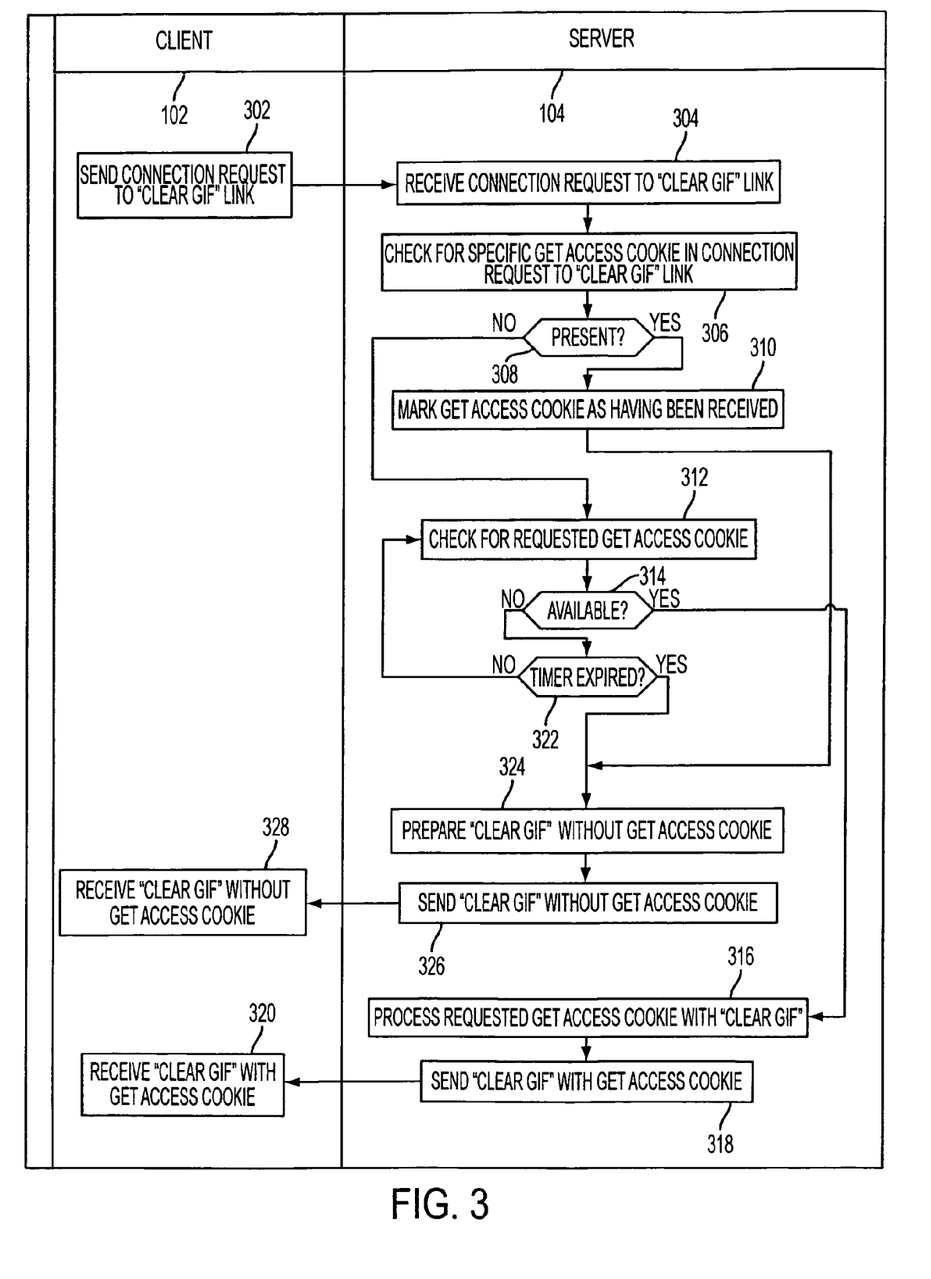
FIG. 3 illustrates steps in a method according to one embodiment of the invention.

In one embodiment, the system and method includes techniques to ensure that the "slow" cookie is received by the client. Referring to FIG. 3, an example of these techniques begins at step 302, with client 102 sending a connection request to server 104, the request including the "clear gif" link. This connection request can be the same connection request illustrated at step 216, or it can be another connection request.

At step 304, server 104 receives the connection request to the "clear gif" link.

At step 306, server 104 checks the connection request to see if it includes the "slow" GET ACCESS cookie.

If at step 308, server 104 determines that the "slow" cookie is present, then at step 310, server 104 makes an entry or record in a buffer or database to indicate that the "slow" GET ACCESS cookie was received by client 102.

After server 104 makes a record that the "slow" cookie was received, then at steps 324-328, server 104 prepares and sends the clear gif without the "slow" cookie. This is because the "slow" cookie has already been received by client 102, as indicated at steps 306 and 308.

If, at step 308, server 104 determines that the cookie is not present in the request, then at step 312, server 104 checks for see if the requested "slow" cookie has been prepared or is in the queue awaiting transmission to client 102. This can be the same or similar to step 221 in FIG. 2

If, at step 314, server 104 determines that the "slow" cookie is available for transmission to client 102, then at step 316 server 104 processes the "slow" cookie with the requested clear gif, and at step 318, server 104 sends the clear gif with the "slow" cookie to client 102. At step 320, client 102 receives the clear gif with the "slow" cookie. The slow cookie is held by client 102 and serves to authenticate or authorize subsequent resource requests by client user.

If, at step 314, server 104 determines that the requested "slow" cookie was not available, then at step 322, server 104 determines whether the timer has expired. This timer can be the same timer illustrated in FIG. 2, or it may be a second timer, started as some point after server 104 receives the connection request sent by client 102 at step 302.

If at step 322, if server 104 determines that the timer has not expired, it loops to step 312 to continue the check for the "slow" cookie.

If at step 322, server 104 determines that the timer has expired, then at step 324, server 104 prepares the clear gif without the requested "slow" cookie, and at step 326 sends the clear gif to client 102. At step 328, client 102 receives the clear gif without the requested cookie.

The techniques that have been described can be implemented in a number of different ways. In one embodiment, the link to the clear gif is manually inserted into the html during page development. In another embodiment, the link to the clear gif is automatically inserted by a plug-in that edits the html output of the application server. In another embodiment, a spacer gif is automatically used, resulting in no changes to the html. This last embodiment is particularly useful where the web site is designed using a "what you see is what you get" ("wysiwyg") editor.

Although illustrative embodiments have been described herein in detail, it should be noted and will be appreciated by those skilled in the art that numerous variations may be made within the scope of this invention without departing from the principle of this invention and without sacrificing its chief advantages. Such variations include: the clear gif can be reloaded not by http redirects but rather by JavaScript that switches the image; the cookies can be set by a webserver plug-in or html included in every page that checks each time a page is requested to see if the slow cookies have been retrieved; or the cookies can be set by a bounce page when the user clicks a link requiring the cookies. There are various advantages and disadvantages of these variations.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. In a computer system comprising a client computer and a server system, wherein the server system controls access to resource websites and generates and sends fast cookies and slow cookies to the client, and wherein the server has already sent a fast cookie to the client and has initially authenticated the client, a method for transmitting slow cookies to the client from the server system, comprising:

a) the server receiving from the client a connection request to the server system, said connection request including a clear gif link, said request (1) including an indicia evidencing client receipt of the slow cookie or (2) not including an indicia evidencing client receipt of the slow cookie; wherein the clear gif link comprises a link to a transparent image file;

b) based on the clear gif link connection request, the server system determining if the slow cookie has been received by the client pursuant to a prior request from the client;

c) wherein, if the slow cookie is determined by the server system to have been previously received by the client, the server system responds to the connection request with a clear gif response without the slow cookie, and permits the client to access further resources from one or more of said websites;

d) wherein, if the slow cookie is determined by the server system not to have been previously received by the client, the server system attempts to generate and provide the slow cookie in a clear gif response that includes the slow cookie;

wherein the fast cookie is immediately available for transmission to the client and the slow cookie is not immediately available for transmission to the client.

2. The method of claim 1 wherein, if the server system determines the slow cookie was not previously received by the client, e) the server system determines if the slow cookie (1) has been prepared or (2) is in the queue awaiting transmission to the client and, if so, f) the server system sends the slow cookie to the client included in the clear gif response.

3. A programmed computer system including a server for connecting a client computer to resource websites, comprising:

(A) a browser for said client computer programmed to send a website connection request to the server, said request including a clear gif link, said request further (1) including an indicia evidencing client receipt of a slow cookie or (2) not including an indicia evidencing receipt of the slow cookie; wherein the clear gif link comprises a link to a transparent image file;

(B) a server including memory and processor wherein the processor is programmed to:

(1) control access to said resource websites;

(2) determine from memory if it has previously sent a fast cookie to said client computer and initially authenticated the client computer;

(3) based on the clear gif link connection request from the client, the server system determining if the slow cookie has been received by the client pursuant to a prior request from the client;

(4) wherein, if the slow cookie is determined by the server system to have been previously received by the client, the server system responds to the connection request with a clear gif response without the slow cookie, and permits the client to access further resources from one or more of said websites;

wherein the fast cookie is immediately available for transmission to the client and the slow cookie is not immediately available for transmission to the client.

4. The computer system of claim 3 wherein, if the server system determines the slow cookie was not previously received by the client, the server system is programmed to:

(5) determine if the slow cookie (a) has been prepared or (b) is in the queue awaiting transmission to the client's browser and, if so, to send the slow cookie to the client computer in a clear gif response the to thereby to enable the client computer to access said website resources.

* * * * *